(12) United States Patent
Hoehl

(10) Patent No.: US 11,255,261 B2
(45) Date of Patent: Feb. 22, 2022

(54) RECIPROCATING-PISTON INTERNAL COMBUSTION ENGINE

(71) Applicant: Bayerische Motoren Werke Aktiengesellschaft, Munich (DE)

(72) Inventor: Johannes Hoehl, Maisach-Oberlappach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 295 days.

(21) Appl. No.: 14/801,163

(22) Filed: Jul. 16, 2015

(65) Prior Publication Data

US 2015/0322853 A1 Nov. 12, 2015

Related U.S. Application Data

(63) Continuation of application No. PCT/EP2014/053449, filed on Feb. 21, 2014.

(30) Foreign Application Priority Data

Mar. 28, 2013 (DE) ..................... 10 2013 205 554.4

(51) Int. Cl.
*F02B 75/22* (2006.01)
*F02B 75/18* (2006.01)
(Continued)

(52) U.S. Cl.
CPC .............. *F02B 75/22* (2013.01); *F02B 61/02* (2013.01); *F02B 75/18* (2013.01); *F16F 15/264* (2013.01);
(Continued)

(58) Field of Classification Search
CPC ........ F02B 75/22; F02B 75/221; F02B 75/18; F02B 2075/1812; F02B 61/02; F16F 15/264; F01B 1/04
(Continued)

(56) References Cited

U.S. PATENT DOCUMENTS 1,740,843 A * 12/1929 Stickney ............... F02B 75/224
123/41.74
2,182,988 A * 12/1939 Iseler .................... F02B 75/224
123/55.1
(Continued)

FOREIGN PATENT DOCUMENTS

CN 1270897 A 10/2000
DE 29 04 066 A1 8/1980
(Continued)

OTHER PUBLICATIONS

Machine translation, Detailed Description of JPS64/021245, Suemori, Jan. 24, 1989, obtained from www.j-platpat.inpit.go.jp, pp. 1-3.*
(Continued)

*Primary Examiner* — Grant Moubry
(74) *Attorney, Agent, or Firm* — Crowell & Moring LLP

(57) ABSTRACT

A reciprocating-piston internal combustion engine includes first, second, and third cylinders, and a crank drive having a crankshaft rotatably mounted in a crank housing. The crankshaft has first and second crank pins, wherein a first and a second connecting rod for a first and a second piston are assigned to the first crank pin, and a third connecting rod for a third piston is assigned to the second crank pin. The first and the second cylinder together with the first and the second piston are arranged in a V-shape, wherein the third cylinder together with the third piston is arranged in the V.

17 Claims, 4 Drawing Sheets

(51) Int. Cl.
  *F02B 61/02* (2006.01)
  *F16F 15/26* (2006.01)
  *F01B 1/04* (2006.01)
(52) U.S. Cl.
  CPC ......... *F01B 1/04* (2013.01); *F02B 2075/1812* (2013.01)
(58) Field of Classification Search
  USPC ...... 123/52.1, 54.1, 54.4, 54.5, 197.4, 193.1
  See application file for complete search history.

(56) References Cited

U.S. PATENT DOCUMENTS

| | | | |
|---|---|---|---|
| 4,658,777 A | 4/1987 | Suzuki | |
| 5,230,311 A * | 7/1993 | Kuhn | F02B 75/22 123/192.2 |
| 5,765,451 A * | 6/1998 | Carone | F02B 75/224 123/197.3 |
| 6,058,901 A | 5/2000 | Lee | |
| 6,257,178 B1 * | 7/2001 | Laimbock | B62K 11/04 123/54.1 |
| D449,620 S | 10/2001 | Feuling | |
| 7,753,012 B2 * | 7/2010 | Neese | F02B 61/02 123/54.4 |
| 8,627,790 B2 * | 1/2014 | Laimboeck | F02B 75/02 123/52.1 |
| 8,726,881 B2 * | 5/2014 | Sato | F01L 1/185 123/184.31 |
| 2006/0260569 A1 | 11/2006 | Nelson | |
| 2008/0168957 A1 | 7/2008 | Neese | |
| 2012/0222505 A1 * | 9/2012 | Almansor | F01B 9/042 74/44 |
| 2015/0322853 A1 | 11/2015 | Hoehl | |

FOREIGN PATENT DOCUMENTS

| | | |
|---|---|---|
| DE | 30 45 974 A1 | 7/1982 |
| DE | 10 2004 042 765 A1 | 6/2005 |
| DE | 10 2008 020 423 A1 | 10/2009 |
| EP | 0 999 356 A2 | 5/2000 |
| EP | 2 978 951 B1 | 11/2016 |
| GB | 104761 A | 3/1917 |
| GB | 149550 A | 8/1920 |
| JP | 58-39832 A | 3/1983 |
| JP | 62-188835 A | 8/1987 |
| JP | 64-21245 A | 1/1989 |
| JP | 8-61080 A | 3/1996 |
| WO | WO 2006/083350 A2 | 8/2006 |

OTHER PUBLICATIONS

Machine Translation, DE102008020423A1, Pongratz, Publ'n date: Oct. 29, 2009, obtained from https://worldwide.espacenet.com/, pp. 1-5.*
International Search Report dated Jul. 8, 2014 with English translation (Four (4) pages).
German-language Search Report dated Nov. 4, 2013 with partial English Translation (Ten (10) pages).
Chinese Office Action issued in counterpart Chinese Application No. 201480003444.9 dated Oct. 8, 2016 with English translation (10 pages).
German-language Japanese Office Action issued in counterpart Japanese Application No. 2016-504524 dated Jun. 6, 2017 (six (6) pages).
Chinese Office Action issued in counterpart Chinese Application No. 201480003444.9 dated Jul. 3, 2017 with English-language translation (nine (9) pages).

* cited by examiner

RECIPROCATING-PISTON INTERNAL COMBUSTION ENGINE

CROSS REFERENCE TO RELATED APPLICATIONS

This application is a continuation of PCT International Application No. PCT/EP2014/053449, filed Feb. 21, 2014, which claims priority under 35 U.S.C. § 119 from German Patent Application No. 10 2013 205 554.4, filed Mar. 28, 2013, the entire disclosures of which are herein expressly incorporated by reference.

BACKGROUND AND SUMMARY OF THE INVENTION

The invention relates to a reciprocating-piston internal combustion engine having a first, a second and a third cylinder, as well as a crank drive with a crankshaft mounted rotatably in a crankcase and having a first and a second crank pin.

With regard to the technical environment, reference is made, for example, to the world-famous Harley-Davidson V2 internal combustion engines with their typical "two-cylinder sound" for Harley-Davidson motorcycles.

These world-famous V2 reciprocating-piston internal combustion engines were developed by Jim Feuling's "Project W3". In this project, in which, as in a V2 internal combustion engine, the two cylinders are arranged in a V-shaped manner one behind the other and the connecting rods act on a common crank pin of the crankshaft, Feuling's construction, however, involves three cylinders which are reminiscent of a "W". Hence the designation "W3". Feuling constructed a novel crankcase onto which a third cylinder together with a cylinder head is mounted offset by 45° into the V. All three cylinders span a plane. A triple-cam-W-three was thus produced from the twin-cam-V-twin. This was possible by the use of a main connecting rod and two secondary connecting rods which divide a common crank pin of the crankshaft. This is a construction which is still used even today in aircraft engines having a radial cylinder arrangement. Feuling's world-famous exceptional construction is protected firstly by US Design Patent U.S. D449,620 S and furthermore by US Design Patent U.S. D417,674.

A disadvantage of Feuling's W3 construction is the large cylinder angle which takes up a relatively large amount of construction space.

German laid-open specification DE 10 2008 020 423 A1 describes another route for realizing a three-cylinder reciprocating-piston internal combustion engine. This laid-open specification discloses a reciprocating-piston internal combustion engine with three cylinders in a V-arrangement, in particular for use in a motorbike. The reciprocating-piston internal combustion engine comprises a crankshaft and also a first outer cylinder, a second outer cylinder and a central cylinder. Each cylinder is assigned a piston and a connecting rod, wherein the outer cylinders are located in a common plane passing through the crankshaft axis, and the central cylinder is located in a plane which is inclined with respect to the first plane and likewise passes through the crankshaft axis. The three-cylinder reciprocating-piston internal combustion engine is distinguished in that the crankshaft has two crank pins, and the connecting rods of the first outer cylinder and of the central cylinder act jointly on the first crank pin and the connecting rod of the second outer cylinder acts on the second crank pin.

A disadvantage of the three-cylinder reciprocating-piston internal combustion engine known from DE 10 2008 020 423 A1 is the relatively large overall width which has a disadvantageous effect in particular on use for a motorbike.

Therefore, the present invention is based on the object of presenting a three-cylinder reciprocating-piston internal combustion engine which has a smaller overall form than the known prior art both in width and in the angular range spanned by the cylinders.

This and other objects are achieved by a reciprocating-piston internal combustion engine, having a first, a second and a third cylinder, as well as a crank drive with a crankshaft mounted rotatably in a crankcase and having a first and a second crank pin. The first crank pin is assigned a first and a second connecting rod for a first and a second piston and the second crank pin is assigned a third connecting rod for a third piston. The first and the second cylinder together with the first and the second piston are arranged in a V-shaped manner, wherein the third cylinder together with the third piston is arranged in the V.

In contrast to other star-shaped reciprocating-piston internal combustion engines, the present invention thus permits a narrower cylinder angle (V-angle) and, at the same time, as compared to other reciprocating-piston internal combustion engines, the elegant and filigree impression of an engine from the aviation tradition. In addition, because of the possible cylinder angles, the present invention makes it possible to implant a W3 reciprocating-piston internal combustion engine virtually into the construction space of a known V2 reciprocating-piston internal combustion engine; the overall width increases only within an uncritical limit.

Third cylinder, together with the third piston, is particularly preferably arranged centrally in the V. The symmetrical arrangement permits a simple mechanical configuration.

In one development, the first, the second and the third cylinder are arranged offset with respect to one another in a direction of the crankshaft axis, which likewise permits a simple mechanical configuration.

In one further development, the first and the second cylinder are arranged in a plane perpendicular to the direction of the crankshaft axis, and the third cylinder is arranged offset with respect to the plane in the direction of the crankshaft axis. This likewise permits a simple mechanical configuration and is a second preferred variant embodiment.

In a further aspect, a first cylinder axis and a second cylinder axis enclose a V angle α of between 45° and 90°. This makes it possible to vary the V-angle and therefore influence the overall width.

Providing different offset angles β, make it possible to realize different ignition sequences, as a result of which the acoustics of the reciprocating-piston internal combustion engine can be positively influenced. This is a particular advantage for installation in a motorbike. Furthermore, an offset angle of 180° crank angle affords the possibility of using a "flat" crankshaft which can be produced substantially more simply and cost-effectively in terms of manufacturing, for example by forging.

In one development, a mass balance shaft of the first order that is drivable by the crankshaft and is aligned parallel to the crankshaft is provided. This influences the running properties and the smoothness (NVH=noise, vibration, harshness) of the three-cylinder reciprocating-piston internal combustion engine in an advantageous manner.

The reciprocating-piston internal combustion engine according to the invention is preferably provided for a single-track vehicle, such as, for example, a motorbike.

For the best possible mechanical construction and a striking visual appearance, the crankshaft of the reciprocating-piston internal combustion engine is preferably installed transversely with respect to a direction of travel of the single-track vehicle, for example of a motorbike.

Other objects, advantages and novel features of the present invention will become apparent from the following detailed description of one or more preferred embodiments when considered in conjunction with the accompanying drawings.

DETAILED DESCRIPTION OF THE DRAWINGS

The same reference numbers are applied to the same components in FIGS. 1 to 4.

Figure 1:
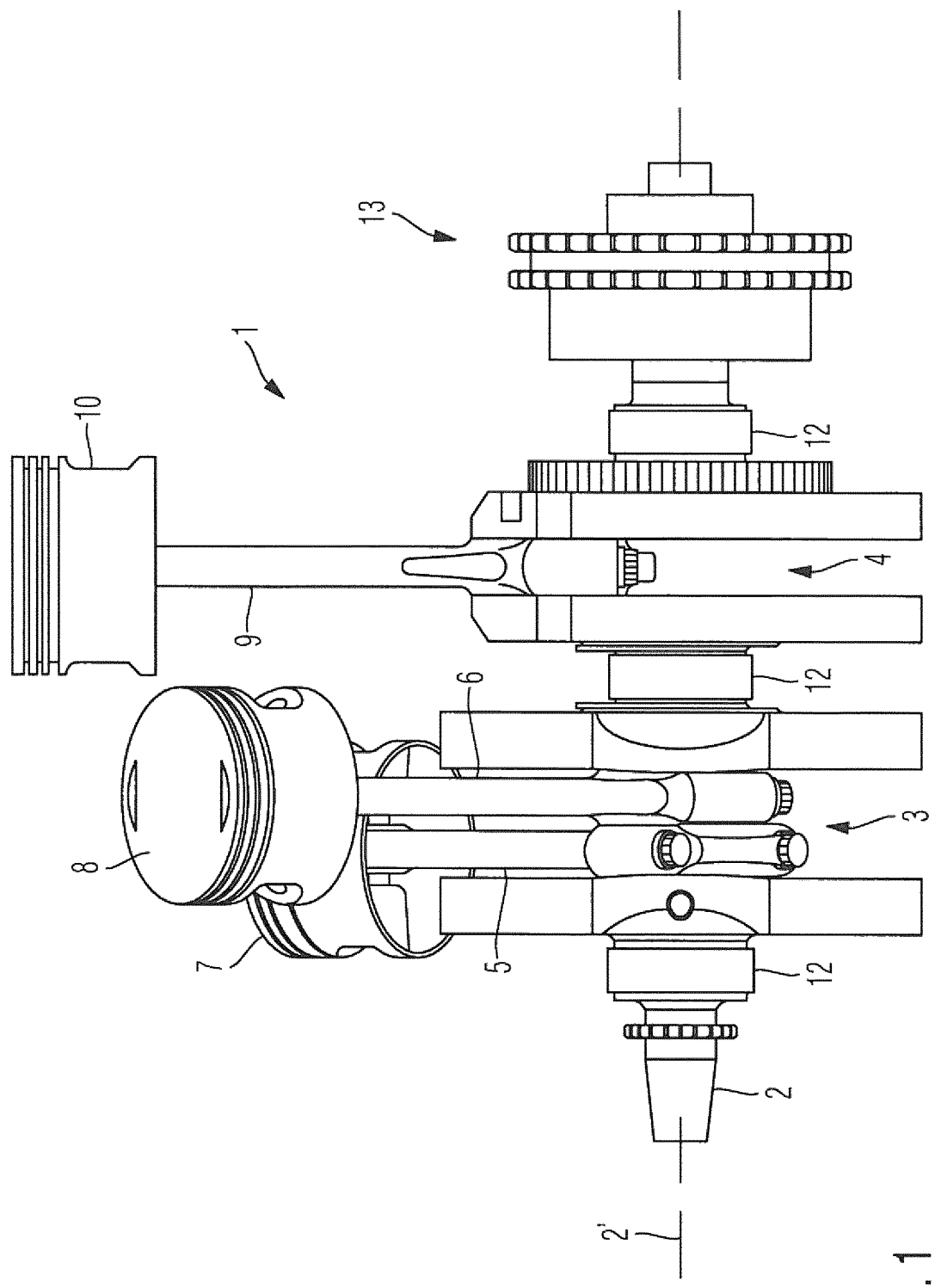
FIG. 1 is a side view of a crank drive for a reciprocating-piston internal combustion engine according to an embodiment of the invention.

FIG. 1 shows a side view of a crank drive 1 for a three-cylinder reciprocating-piston internal combustion engine 18. A crankshaft axis 2' of a crankshaft 2 is illustrated by a dash-dotted line. The reciprocating-piston internal combustion engine 18 has first, second and third cylinders 15, 16, 17 (illustrated in FIG. 4), as well as the crank drive 1 with the crankshaft 2, which is mounted rotatably in a crankcase (not illustrated) and has first and second crank pins 3, 4. The first crank pin 3 is assigned a first and a second connecting rod 5, 6 for a first and a second piston 7, 8. The second crank pin 4 is assigned a third connecting rod 9 for a third piston 10. The first and the second cylinder 15, 16 are arranged together with the first and the second piston 7, 8 in a V-shaped manner. According to an embodiment of the invention, the third cylinder 17 together with the third piston 10 is arranged in the V of the first and second cylinder 15, 16 (illustrated in FIG. 2). For the mounting of the crankshaft 2, the crankshaft has three journals 12. On the end side, adjacent to the third cylinder 17, a main drive pinion 13 having a twin toothed pinion is arranged on the crankshaft 2.

The third cylinder 17 together with the third piston 10 is particularly preferably arranged centrally in the V formed by the first cylinder 15 and the second cylinder 16. This permits a particularly simple mechanical construction of the reciprocating-piston internal combustion engine 18.

A further simplification of the mechanical construction is achieved in that the first, second and third cylinders 15, 16, 17 are arranged offset with respect to one another in an alignment of a crankshaft axis 2'. By means of this offset, the overall width of the reciprocating-piston internal combustion engine 18 can be influenced in a simple manner and, therefore, so too can the V angle α of the first and the second cylinder 15, 16.

In a further preferred variant embodiment which is not illustrated in FIGS. 1 to 4, the first and second cylinder 15, 16 are arranged in a plane perpendicular to the direction of the crankshaft axis, and the third cylinder 17 is arranged offset with respect to the plane in a direction of the crankshaft axis. In this variant, the first and/or the second piston 7, 8 are equipped, for example, with a forked connecting rod.

Figure 2:
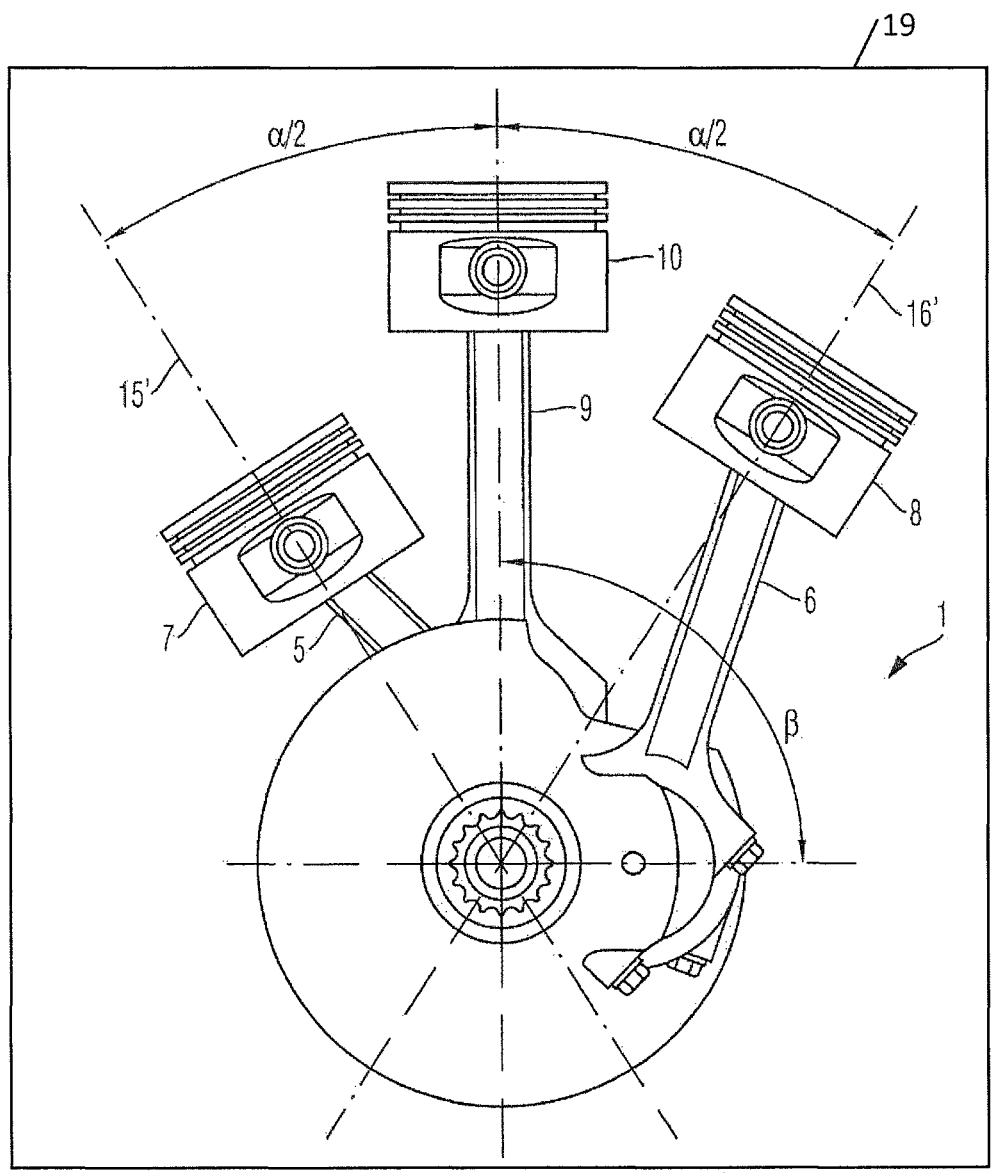
FIG. 2 is a front view of the crank drive of the reciprocating-piston internal combustion engine according to an embodiment of the invention.

A first cylinder axis 15' and a second cylinder axis 16' particularly preferably have a V angle α between 45° and 90°, illustrated in FIG. 2.

In three further variant embodiments, the first and the second crank pins 3, 4 have an offset angle β of 90° or preferably 180° or 270° crank angle. The 90° (270° variant is illustrated in FIG. 2. The different offset angles β make it possible in an advantageous manner to realize different ignition sequences, as a result of which the acoustics of the reciprocating-piston internal combustion engine can be positively influenced, which is of advantage in particular in the case of installation in a motorbike 19. Furthermore, the offset angle of 180° crank angle affords the possibility of using a "flat" crankshaft which can be produced substantially more simply and cost-effectively in terms of manufacturing, for example by means of forging.

For particularly good smoothness of the reciprocating-piston internal combustion engine 18, a mass balance shaft 11 of the first order that is drivable by the crankshaft 2 and is aligned parallel to the crankshaft 2 is provided. The mass balance shaft 11 can be seen in FIG. 3.

The reciprocating-piston internal combustion engine 18 is preferably provided for a single-track vehicle, such as a motorbike. However, it can also be readily installed in a motor vehicle.

When the reciprocating-piston internal combustion engine 18 is installed in a single-track vehicle, the longitudinal axis 2' of the crankshaft is preferably installed transversely with respect to a driving direction of the single-track vehicle. However, it is also contemplated and possible to install the same longitudinally.

FIG. 2 shows a front view of the crank drive 1 for a reciprocating-piston internal combustion engine 18. The V angle between the first cylinder axis 15' and the second cylinder axis 16', which V-angle is divided into two half V angles α/2, can be seen in particular in FIG. 2. In the exemplary embodiment illustrated, the V angle α is 65° crank angle, but can vary in other exemplary embodiments between 45° and 90° crank angle. In yet a further exemplary embodiment, the V angle α does not have to be divided uniformly, i.e. into α/2. It can also be divided, for example, into α/3 and 2α/3. The sound of the three-cylinder internal combustion engine 18 can be influenced in turn via the variation in angle.

Furthermore, an offset angle β of the first and the second crank pin 3, 4, which is 90° in this exemplary embodiment, is shown. In further exemplary embodiments, the offset angle β can also be 180° or 270° crank angle; of course, angular deviations are also possible.

Figure 3:
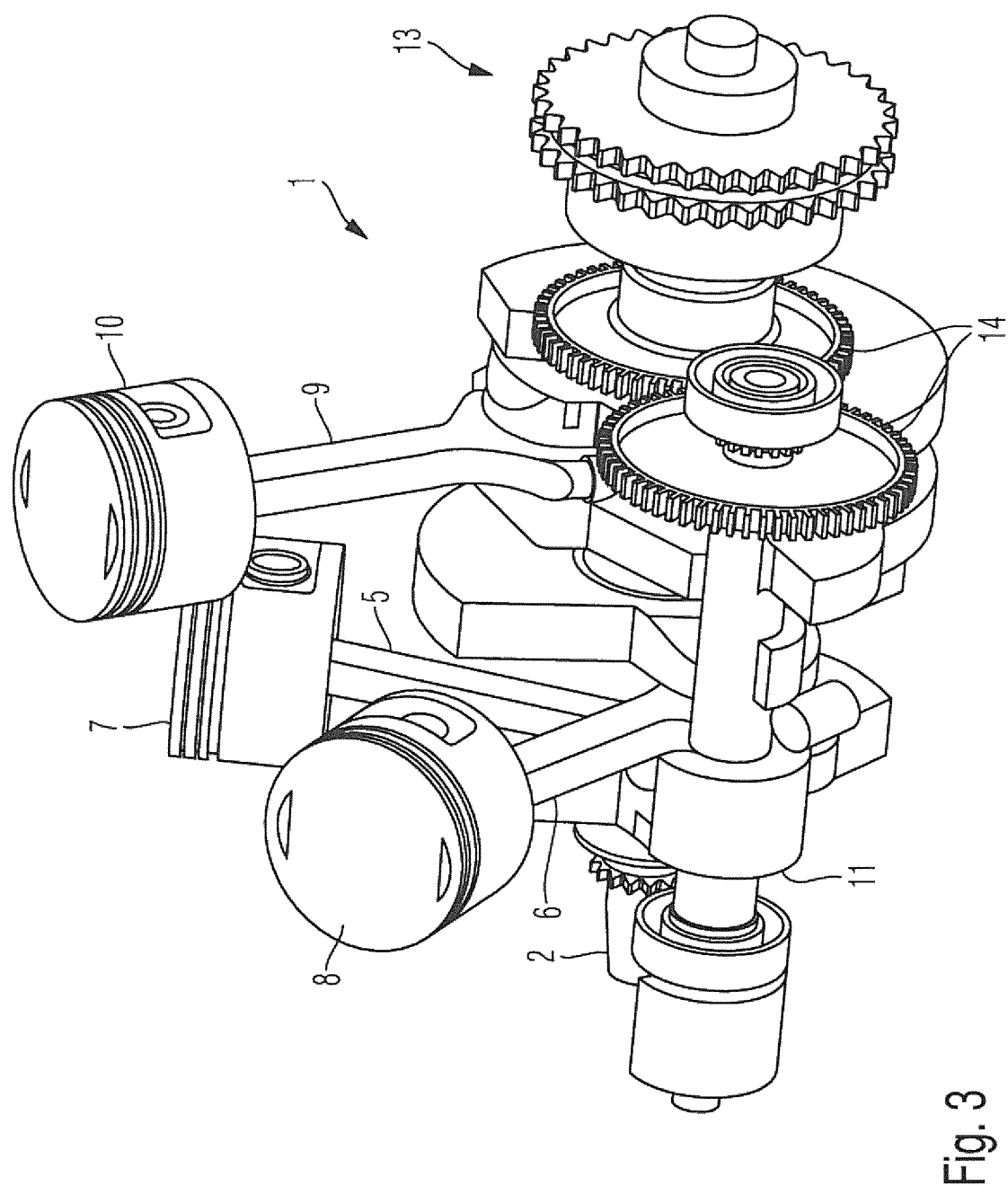
FIG. 3 is a three-dimensional illustration of the crank drive of the reciprocating-piston internal combustion engine according to an embodiment of the invention.

FIG. 3 furthermore shows a three-dimensional view of the crank drive 1 for the reciprocating-piston internal combustion engine 18. The already-mentioned balance shaft 11 of the first order that is drivable in a phase-rigid manner by the crankshaft 2 via a pair of gearwheels 14 can also be seen in addition to the crank drive 1. Balance shafts of the first order are generally known to a person skilled in the art and therefore the balance shaft here is not explained in more detail.

Figure 4:
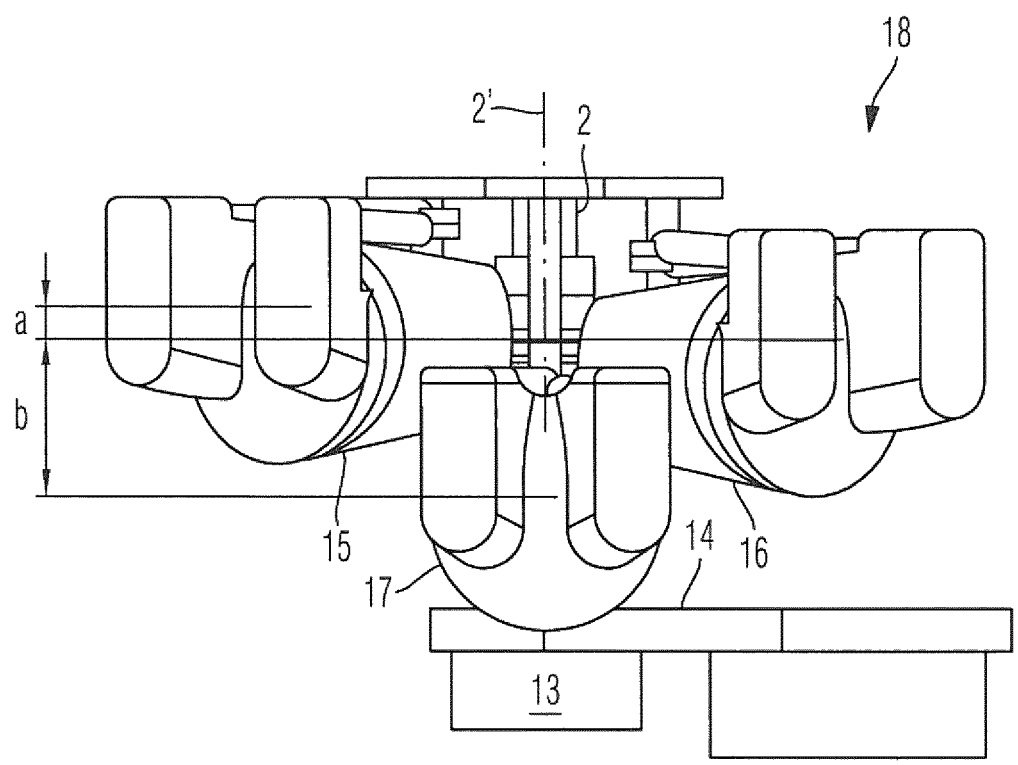
FIG. 4 is a top view of a reciprocating-piston internal combustion engine according to an embodiment of the invention.

FIG. 4 shows a top view of three cylinder heads (not numbered separately) of the first cylinder 15, the second cylinder 16 and the third cylinder 17 of the reciprocating-piston internal combustion engine 18. The crankshaft is again numbered by 2 and the main drive pinion of the crankshaft 2 by 13.

In FIG. 4, an offset of the first cylinder 15 with respect to the second cylinder 16 is labeled with a, and an offset of the second cylinder 16 with respect to the third cylinder 17 with b.

In a further variant embodiment (not illustrated), the first and the second cylinders 15, 16 are arranged in a plane perpendicular to the direction of the crankshaft axis, and the third cylinder 17 is arranged offset with respect to the plane in the direction of the crankshaft axis. In this variant, the first and/or the second pistons 7, 8 are equipped, for example, with a forked connecting rod.

In contrast to other star-shaped reciprocating-piston internal combustion engines, the present invention therefore permits a narrower cylinder angle (V angle) and at the same time, in comparison to other reciprocating-piston internal combustion engines, the elegant and filigree impression of a reciprocating-piston internal combustion engine from the aviation tradition.

In addition, because of the possible cylinder angles, the present invention makes it possible to implant a W3 reciprocating-piston internal combustion engine 18 virtually into the construction space of a known V2 reciprocating-piston internal combustion engine; the overall width increases only within an uncritical limit.

Similarly, with such a reciprocating-piston internal combustion engine 18, the sound of a V2 reciprocating-piston internal combustion engine can be imitated, the sound even sounding somewhat "fresher".

In addition to the refinement according to the invention of a three-cylinder reciprocating-piston internal combustion engine, a four-cylinder reciprocating-piston internal combustion engine, in which two connecting rods together with pistons are each arranged on a common crank pin and the two crank pins are arranged on a common crankshaft, can also be presented.

LIST OF REFERENCE NUMBERS

1. Crank drive
2. Crankshaft
2' Crankshaft axis
3. First crank pin
4. Second crank pin
5. First connecting rod
6. Second connecting rod
7. First piston
8. Second piston
9. Third connecting rod
10. Third piston
11. Mass balance shaft
12. Journal
13. Main drive pinion
14. Pair of gearwheels
15. First cylinder
15' First cylinder axis
16. Second cylinder
16' Second cylinder axis
17. Third cylinder
18. Reciprocating-piston internal combustion engine
19. Motorbike The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A three-cylinder reciprocating-piston internal combustion engine of a single-track vehicle, comprising:
   first, second and third cylinders;
   a crankshaft mounted rotatably in a crankcase,
   first and second crank pins;
   first, second and third connecting rods for first, second and third pistons, respectively, of the first, second and third cylinders, wherein
   the first crank pin is assigned to the first and second connecting rods for the first and second pistons,
   the second crank pin is assigned to the third connecting rod for the third piston,
   the first and second cylinders together with the first and second pistons are arranged in a V-shape,
   the third cylinder together with the third piston is arranged between the first and second pistons inside the V-shape when viewed along a crankshaft rotation axis,
   a first cylinder axis of the first cylinder and a second cylinder axis of the second cylinder enclose a V angle $\alpha$ of between 45° and 80°.

2. The reciprocating-piston internal combustion engine according to claim 1,
   wherein the third cylinder together with the third piston is arranged centrally in the V.

3. The reciprocating-piston internal combustion engine according to claim 2, wherein the first, second and the third cylinders are arranged offset with respect to one another in a direction of a crankshaft axis.

4. The reciprocating-piston internal combustion engine according to claim 2, wherein:
   the first and second cylinders are arranged in a plane perpendicular to a direction of the crankshaft axis, and
   the third cylinder is arranged offset with respect to the plane in the direction of the crankshaft axis.

5. The reciprocating-piston internal combustion engine according to claim 1, wherein the first, second and the third cylinders are arranged offset with respect to one another in a direction of a crankshaft axis.

6. The reciprocating-piston internal combustion engine according to claim 1, wherein:
   the first and second cylinders are arranged in a plane perpendicular to a direction of the crankshaft axis, and
   the third cylinder is arranged offset with respect to the plane in the direction of the crankshaft axis.

7. The reciprocating-piston internal combustion engine according to claim 1, wherein the first and second crank pins have an offset angle $\beta$ of 90° crank angle.

8. The reciprocating-piston internal combustion engine according to claim 1, wherein the first and second crank pins have an offset angle $\beta$ of 180° crank angle.

9. The reciprocating-piston internal combustion engine according to claim 1, wherein the first and second crank pins have an offset angle $\beta$ of 270° crank angle.

10. The reciprocating-piston internal combustion engine according to claim 1, further comprising:
    a mass balance shaft of a first order configured to be drivable by the crankshaft, the mass balance shaft being aligned parallel to the crankshaft.

11. A vehicle, comprising:
    a single-track vehicle; and
    a three-cylinder reciprocating-piston internal combustion engine comprising:
    first, second and third cylinders;

a crankshaft mounted rotatably in a crankcase,
first and second crank pins;
first, second and third connecting rods for first, second and third pistons, respectively, of the first, second and third cylinders, wherein
the first crank pin is assigned to the first and second connecting rods for the first and second pistons,
the second crank pin is assigned to the third connecting rod for the third piston,
the first and second cylinders together with the first and second pistons are arranged in a V-shape when viewed along a crankshaft rotation axis, and
the third cylinder together with the third piston is arranged between the first and second pistons inside the V-shape,
a first cylinder axis of the first cylinder and a second cylinder axis of the second cylinder enclose a V angle $\alpha$ of between 45° and 80°.

12. The vehicle according to claim 11, wherein the third cylinder together with the third piston is arranged centrally in the V.

13. The vehicle according to claim 11, wherein the first, second and the third cylinders are arranged offset with respect to one another in a direction of a crankshaft axis.

14. The vehicle according to claim 11, wherein:
the first and second cylinders are arranged in a plane perpendicular to a direction of the crankshaft axis, and
the third cylinder is arranged offset with respect to the plane in the direction of the crankshaft axis.

15. The vehicle according to claim 11, wherein the first and second crank pins have an offset angle $\beta$ of 90° crank angle.

16. The vehicle according to claim 11, further comprising:
a mass balance shaft of a first order configured to be drivable by the crankshaft, the mass balance shaft being aligned parallel to the crankshaft.

17. The vehicle according to claim 11, wherein the reciprocating-piston internal combustion engine is installed such that the crankshaft axis is substantially transverse to a direction of travel of the single-track vehicle.

* * * * *